US005136768A

United States Patent [19]

Sato

[11] Patent Number: 5,136,768

[45] Date of Patent: Aug. 11, 1992

[54] CLIP DRIVER

[75] Inventor: Hisao Sato, Tokyo, Japan

[73] Assignee: Kuniko Nagumo, Tokyo, Japan

[21] Appl. No.: 678,718

[22] Filed: Apr. 1, 1991

[30] Foreign Application Priority Data

Nov. 28, 1990 [JP] Japan ............................... 2-326362

[51] Int. Cl.[5] ............................................ B23P 11/00

[52] U.S. Cl. ................................ 29/243.56; 227/156

[58] Field of Search ............ 29/243.56, 243.5, 243.57, 29/270, 278; 403/344; 227/19, 156

[56] References Cited

U.S. PATENT DOCUMENTS 4,353,157 10/1982 Sato ................................ 29/243.56

*Primary Examiner*—Bruce M. Kisliuk
*Assistant Examiner*—Eileen Morgan
*Attorney, Agent, or Firm*—Kanesaka and Takeuchi

[57] ABSTRACT

Disclosed is a clip driver in which grasping portions of a clip based so as to contact with each other are opened or widened so that documents or the like are grasped between the grasping portions. The clip driver has a casing body made of a single rectangular plate-like member of synthetic resin. The casing body is composed of a bottom portion having longitudinally extending opposite edge portions, a pair of side portions respectively having longitudinally extending one edge portions bendably continuously connected to the respective opposite edge portions of the bottom portion, a pair of upper portions respectively having longitudinally extending one edge portions continuously connected at substantially right angles to the longitudinally extending other edges of the respective side portions, each of the upper portions having a width in a direction perpendicular to the longitudinally extending edge portion thereof which is substantially half of a width of the clip driver, and a cap portion continuously bendably connected at its one side to a rear end of the bottom portion. Notch portions are formed in the front end surfaces of the side portions respectively so as to form the opening portion, and clip opening spring portions are formed on the side portions respectively, each of the clip opening spring portions having a vertex end portion and a pair of leg portions extending from the vertex end portion toward the notch portion so as to gradually separate from each other.

9 Claims, 7 Drawing Sheets

CLIP DRIVER

BACKGROUND OF THE INVENTION

1. Field of the Invention

The present invention generally relates to a clip driver for binding documents or the like by using a clip. It particularly relates to a clip driver in which a plurality of clips are accommodated. Each clip is formed of a single elastic plate-like member which is bent to have a pair of grasping portions abutting against each other. In the clip driver, the plurality of clips are successively sent one by one to a position in which the grasping portions of the clip located in that position are opened so as to grasp documents or the like therebetween.

2. Description of the Related Art

To bind a plurality of loose documents together, generally, a stapler, a Gem clip, or the like has been used. In a stapler, however, there has been a disadvantage in that the documents are injured because a staple accommodated in the stapler is stuck through the documents to bind them together. In the case of a Gem clip in which documents are inserted between double ring portions of the Gem clip so as to be bound together, on the other hand, there is a disadvantage in that the documents are apt to come off from the Gem clip and that the Gem clip is not suitable to clip a large number of documents together, although the Gem clip has an advantage in that the documents are not injured by the Gem clip. There has been therefore proposed a clip which is formed in such a manner that an elastic plate-like member is bent to form a pair of grasping portions abutting against each other at the extremities thereof and rotatable levers are provided outside the grasping portions so that the levers are operated by fingers to thereby open the nip between the grasping portions so as to grasp documents or the like therebetween. In the clip, however, there has been a disadvantage in that in order to bind a large number of documents together, the clip must be made large in size and the levers must be pushed with strong force to move the abutment surfaces away from each other. Such a clip is therefore unsuitable for a person whose finger force is weak. Further, if other documents are stacked on the documents bound already by this clip, there has been a possibility that the other documents stacked on the documents bound already by such a clip may be injured by the clip.

In U.S. Pat. No. 4,332,060 patented Jun. 1, 1982, therefore, the inventor of this application has proposed a clip having no such levers as described above and also disclosed a driver for driving out such a clip. That is, the inventor of this application has proposed a clip which is formed by bending a single elastic plate-like member so as to have a bent portion and a pair of grasping portions continued to the bent portion, the grasping portions being normally in contact with each other. The clip driver is constituted by a clip accommodation portion for accommodating the clip therein, a clip opening portion provided at the front end of the accommodation portion and arranged so that the clip opening portion may be inserted into the nip between the grasping portions of the clip so as to open the grasping portions against the elasticity of the clip, and a lever slidably inserted into the accommodation portion from the rear end thereof so as to abut against the bent portion of the clip to thereby push the clip toward the clip opening portion. That is, the clip opening portion includes a guide spring which urges the grasping portions of the clip to open the nip therebetween when the clip opening portion is inserted into the nip between the grasping portions. If the lever is further pushed after the nip between the grasping portions have been opened by the guide spring in which documents or the like have been inserted between the grasping portions, the clip is ejected out of the front end of the clip driver under the condition that the documents are grasped by the clip.

In such a clip driver, however, there has been a disadvantage in that since only one clip is pushed out by the front end of the lever, it is impossible to accommodate a plurality of such clips in advance so as to successively push out the accommodated clips. Accordingly, inconveniently, it has been necessary to load a clip into the accommodation portion every time a clip is to be driven out.

Accordingly, the inventor of this application has improved the aforementioned clip driver, and has proposed, in U.S. Pat. No. 4,353,157 patented Oct. 12, 1982, a hand clip driver in which a knob is slidably provided above an accommodation portion so that a clip in the accommodation portion can be pushed out to a clip opening portion by means of the knob, and in which a plurality of clips can be loaded in the accommodation portion so that after one clip at the head of the loaded clips has been pushed out the knob is retreated to abut on a bent portion of the next clip and then pushed forward to displace this clip to the clip opening portion. By this hand clip driver, it has been made possible that a plurality of clips can be accommodated in the clip driver in advance so that documents or the like can be bound together successively and continuously. This hand clip driver has however a disadvantage in that it is necessary to retreat the knob in order to send a new clip to the clip opening portion each time. Thus, the operation is troublesome. Further, the clip driver is so complicated in structure that the number of parts is large and the cost of the clip driver is high.

In order to eliminate such a disadvantage, the inventor of this application has further proposed, in U.S. Pat. No. 4,996,755 a clip driver in which a new clip can be located at a clip opening portion without operating any knob. This clip driver is constituted by a pair of upper and lower casings, a knob for pushing-out a clip, a pair of clip opening spring members for opening or widening the grasping portions of the clip in the directions opposite to each other, an elastic member for normally biasing the knob toward a rear end side of the clip driver, and a fastening band for fastening the upper and lower casings to each other. The lower casing has, at its front end, a lower opening portion forming a part of an insertion inlet for inserting documents or the like, and has an upper surface on which at least one clip is mounted with the grasping portions directed toward the insertion inlet so that the clip is slidable in the longitudinal direction of the clip driver. On the other hand, the upper casing has, at its front end, an upper opening portion forming the insertion inlet together with the lower opening portion of the lower casing, and has, at its rear end, a clip insertion inlet for inserting a clip. The knob is mounted in a rectangular opening formed in the upper casing at its front end side so as to extend in the longitudinal direction, and is made to be slidable in the longitudinal direction and movable up and down within a predetermined range. Further, the knob has a knob projection portion projected upward from the opening, a push-out portion formed on a front end of the knob projection portion so that the push-out portion comes to abut against a bent portion of the clip when the knob is lowered, and a projection portion rearward extending from a rear end of the knob projection portion. The pair of clip opening members are provided in the insertion inlet formed by the lower and upper casings, and the elastic member is provided with its opposite ends attached to the projection portion of the knob and to the lower surface of the upper casing.

In this clip driver, the front end of the knob for pushing-out a clip is normally biased upward by the elastic member. Accordingly, if the knob is released from a finger after a clip at the head of the loaded clips has been pushed out of the clip driver, the next clip can be made positioned in front of the knob without receiving any obstacle by the front end of the knob. Thus, unlike the conventional clip driver, it is not necessary to retreat the knob to make the next clip position in front of the knob. Further, a plurality of clips can be accommodated so that a plurality of loose documents or the like can be continuously bound together. As the constituent parts of this clip driver, however, seven parts of six kinds have been needed as described above. Further, the assembling work of the clip driver is so complicated and troublesome that the clip driver becomes expensive correspondingly.

SUMMARY OF THE INVENTION

It is therefore an object of the present invention to provide a clip driver having a simple configuration in which the number of the constituent parts thereof is minimized.

It is another object of the present invention to provide a clip driver in which a casing body thereof can be completed only by bending work so as to facilitate the set up work to thereby minimize the cost of materials and simplify the assembling process so that the clip driver can be made inexpensive and dispensable.

In order to attain the above objects, according to an aspect of the present invention, the clip driver has a casing body which is made of a rectangular plate-like member of synthetic resin composed of: a bottom portion having longitudinally extending opposite edge portions; a pair of side portions respectively having longitudinally extending edge portions bendably continuously connected to the respective opposite edge portions of the bottom portion; a pair of upper portions respectively having longitudinally extending edge portions continuously connected at substantially right angle to the longitudinally extending other edges of the respective side portions, each of the upper portions having a width in a direction perpendicular to the longitudinally extending edge portion thereof which is substantially half of a width of the clip driver; and a cap portion continuously bendably connected at its one side to a rear end of the bottom portion. Notch portions are formed in the front end surfaces of the side portions respectively so as to form the opening portion, and clip opening spring portions are formed on the side portions respectively, each of the clip opening spring portions having a vertex end portion and a pair of leg portions extending from the vertex end portion toward the notch portion so as to gradually separate from each other. Knob openings are formed respectively in the upper portions adjacently to the notch portions for mounting the knob member. The side portions and the cap portion are erected up from the bottom portion at continuously bendably connecting portions therebetween so as to form a pillar-like casing body having therein a path for accommodating the clips.

That is, when the casing body is set up in such a manner that the side portions are erected up from the bottom portion, the two outside longitudinal edges of the upper portions come into contact with each other so that the pillar-shaped casing body is formed. The knob member is mounted in the casing body in a manner so that one side portion of the knob member is fitted into the knob opening of one of the upper portions and the other side portion of the knob member is fitted into the knob opening of the other upper portion while the side portions is erected up, so that the knob member can be fitted into the knob openings without using any jig. After the casing body has been set up into a pillar shape, clip are inserted, into the clip path, one after one with the grasping portions thereof made head from the rear end surface of the casing body. Finally, the cap portion is erected up so as to cover the rear end portion of the casing body. Since the casing body can be set up only by bending a single member as described above, and since all the various portions of the casing body which are to be erected up are directed upward when the casing body is in a single flat-plate state, the molding of the single member can be extremely easily performed and also the assembling of the clip drive can be easily performed. Consequently, according to the present invention it is possible to provide a clip driver which can be produced so inexpensively that the clip driver is disposable.

These and other objects and advantages of the present invention will become clear by the following description of a preferred embodiment of the present invention.

DETAILED DESCRIPTION OF THE PREFERRED EMBODIMENT

An embodiment of the clip driver according to the present invention will be described below with reference to the accompanying drawings. In the following description, the terms "front" and "rear" are defined to be the sides of the clip driver from which a clip is pushed out and through which a clip is inserted, respectively.

The clip driver 11 is constituted by an elongated casing body 12 of synthetic resin such as butadiene-styrene copolymer resin, polypropylene, or the like, having a hinge effect, a knob 13 of synthetic resin mounted on the upper surface of the casing body 12 so as to be slidable in the longitudinal direction of the clip driver 11, and a coil spring 14 for elastically biasing the knob 13.

Figure 8:
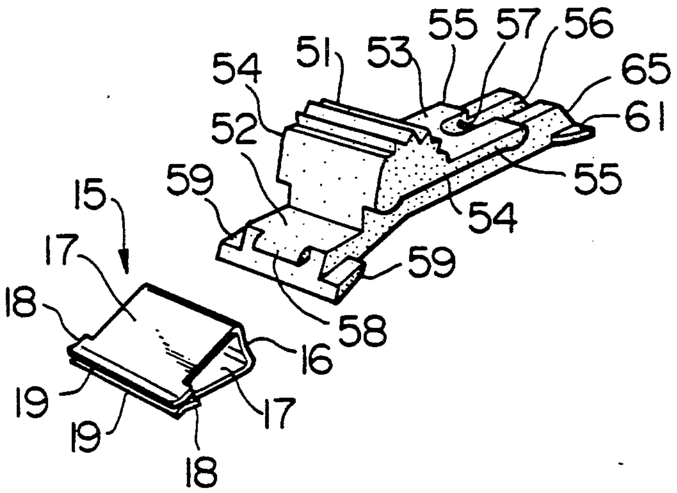
FIG. 8 is a perspective view showing the knob and the clip.

A clip 15 to be used in the driver 11 is constituted by a continuous body which is formed by bending a rectangular plate-like member of metal or synthetic resin in a manner so that, as shown in FIG. 8, a bent portion 16 is provided at the longitudinally central portion of the plate-like member and a pair of grasping portions 17 respectively having extremities elastically contacting with each other are provided continuously integrally with the bent portion 16. A pair of sideward projecting lug portions 18 for opening or widening the grasping portions 17 are formed on the front end opposite sides of each of the grasping portions 17. Guide portions 19 bent in the outward directions opposite to each other are formed on the respective extremities of the grasping portions 17 including the lug portions 18 so that the grasping portions 17 can be easily opened.

The casing body 12 of the clip driver 11 is constituted by a bottom portion 21 having longitudinally extending opposite edge portions, side portions 22 and 23 respectively having longitudinally extending edge portions continuously connected to the above-mentioned opposite edge portions of the bottom portion 21, upper portions 24 and 25 integrally formed at right angle at the longitudinally extending other edge portions of the respective side portions 22, and a cap portion 26 having one side continuously connected to a rear end of the bottom portion 21. The width of each of the upper portions 24 and 25 is selected to be substantially half of that of the clip driver 11. Thinner thickness portions 27 are formed in boundary portions between the bottom portion 21 and each of the side portions 22 and 23 and between the bottom portion 21 and the cap portion 26 so that the side portions 22 and 23 and the cap portion 26 are bendable relative to the bottom portion 21.

Figure 2:
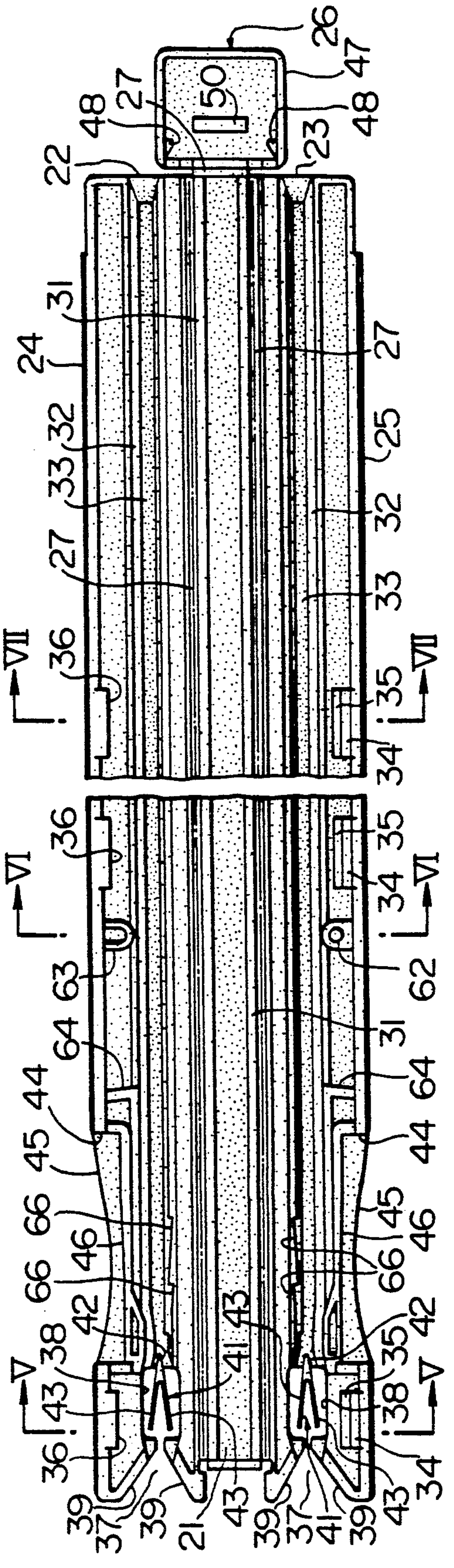
FIG. 2 is a top plan view showing the casing body before assembly, a part of the casting body being partly omitted.
Figure 7:
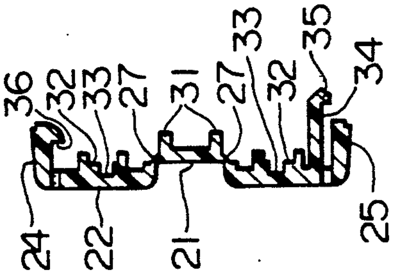
FIG. 7 is a sectional view taken on line VII—VII of FIG. 2.
Figure 6:
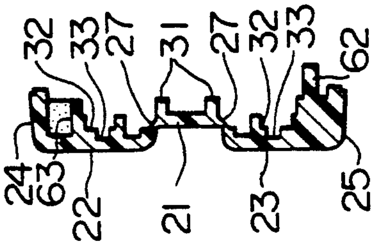
FIG. 6 is a sectional view taken on line VI—VI of FIG. 2.
Figure 5:
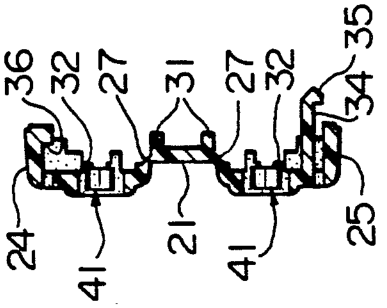
FIG. 5 is a sectional view taken on line V—V of FIG. 2.
Figure 3:
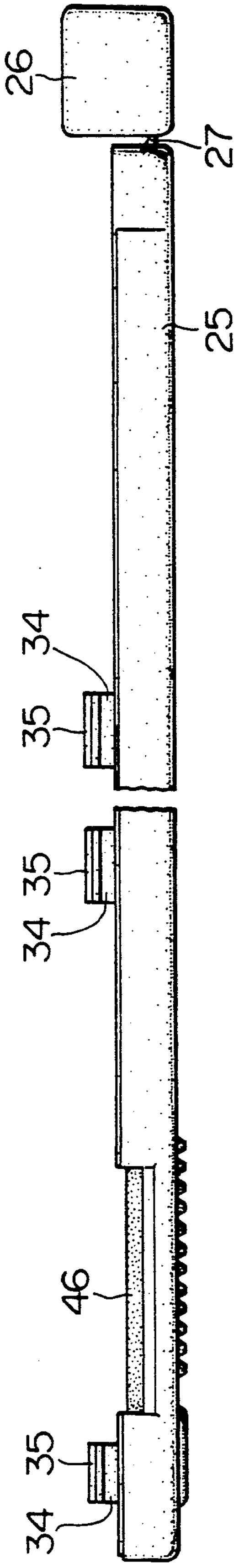
FIG. 3 is a side view of FIG. 2.

Reinforcing rims 31 are formed on longitudinally extending end edge portions of the inner surface of the bottom portion 21 so as to project toward this side in FIG. 2 and rightward in FIGS. 5 through 7. The width of the bottom portion 21 is selected to be smaller than that of the bent portion 16 of the clip 15.

The respective inner surfaces of the side portions 22 and 23 are even to the inner surface of the bottom portion 21. A pair of longitudinally extending first grooves 32 is formed in the respective inner surfaces of the side portions 22 and 23. Each of the first grooves 32 has a width slightly larger than the thickness of the bent portion 16 of the clip 15 so that the side edges of the grasping portions 17 of the clip 15 at the bent portion 16 side are movably fitted in each first groove 32. A pair of longitudinally extending second grooves 33 are formed in the substantially transversely central portions of the pair of first grooves 32 respectively so that the lug portions 18 of the clip 15 are movably fitted in each of the second grooves 33. The first and second grooves 32 and 33 are formed so that the first grooves 32 are opposite to each other and the second grooves 33 are opposite to each other when the side portions 22 and 23 are erected up, at the thin portions 27 which are the boundaries between the bottom portion 21 and the side portions 22 and 23, so as to be in opposition to each other. The distance between the respective bottom portions of the two first grooves 32 when the grooves 32 are in opposition to each other is selected to be substantially equal to the width of the clip 15 at the grasping portions 17. The distance between the respective bottom portions of the two second grooves 33 when the grooves 33 are in opposition to each other, on the other hand, is selected to be substantially equal to the width of the clip 15 at the widthwise opposite lug portions 18. A plurality of engagement portions 34 is formed on the inner surface of the side portion 23 at the upper portion 25 side at suitable longitudinal intervals so as to project more upward than the upper portion 25. Hooks 35 are formed on the front end portions of the respective engagement portions 34 at the upper portion 25 side. When the side portions 22 and 23 are bent at the thin portions 27 so as to be opposite to each other, those hooks 35 are engaged with hooks 36 which are formed correspondingly to the hooks 35 on the back surface of the front end of the upper portion 24.

Figure 4:
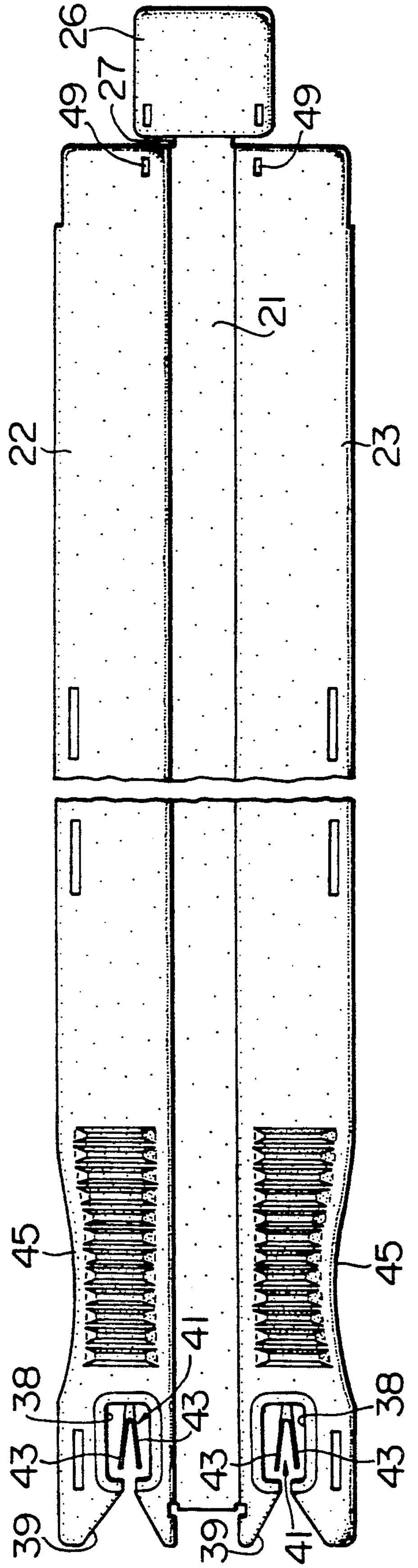
FIG. 4 is a bottom plan view of FIG. 2.
Figure 9:
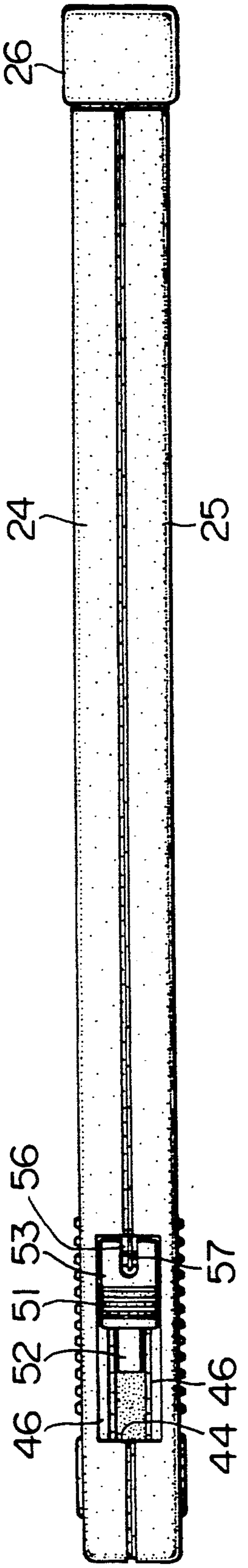
FIG. 9 is a top plan view showing the assembled clip driver.
Figure 10:
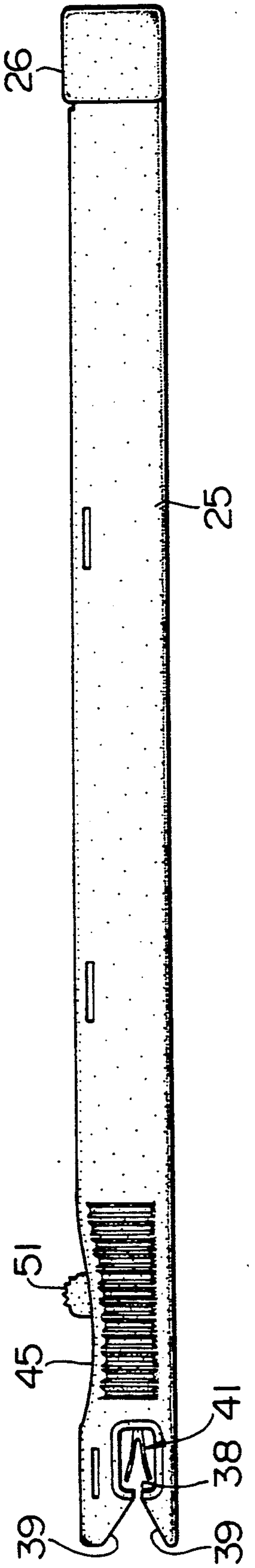
FIG. 10 is a side view of FIG. 9.
Figure 11:
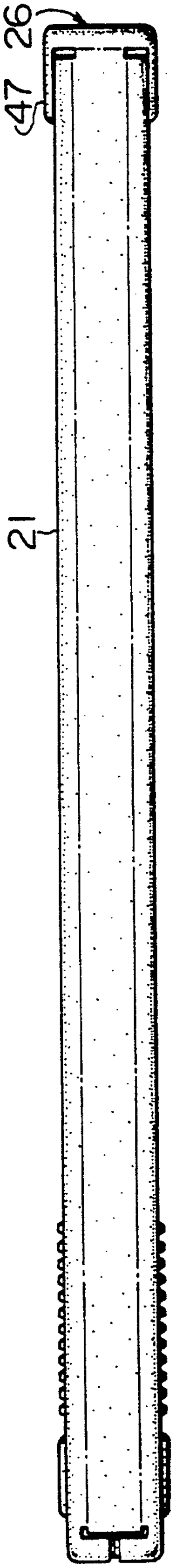
FIG. 11 is a bottom plan view of FIG. 9.
Figure 12:
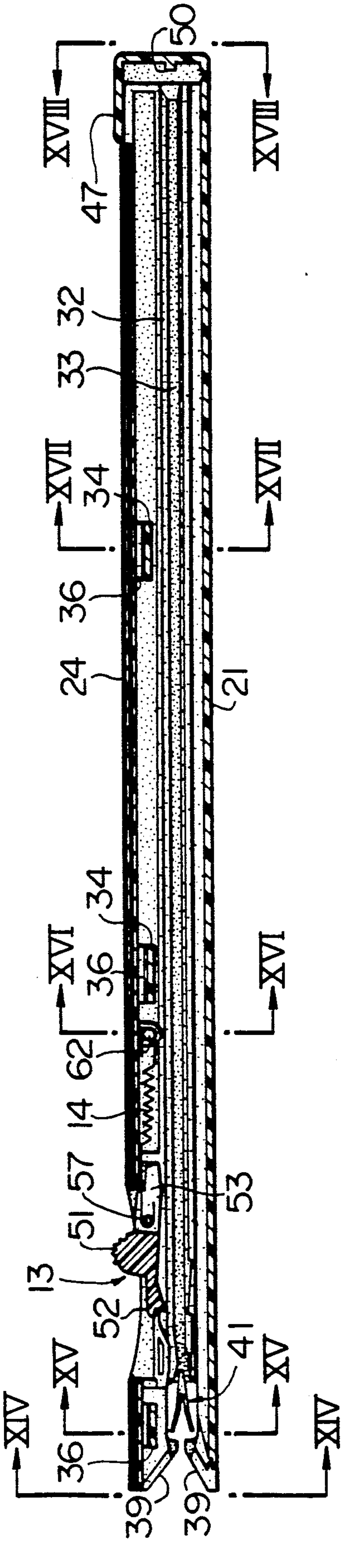
FIG. 12 is a longitudinal sectional view of FIG. 9.

In each of the front end portions of the side portions 22 and 23, as shown in FIGS. 2 and 4, there are provided a substantially lateral-turned V-shaped notch portion 37 having a width which is made gradually narrow from the front end surface toward the rear portion, and a rectangular opening portion 38 continued from a vertex portion of the notch portion 37. The respective front ends of the first and second grooves 32 and 33 are terminated at the substantially central portion on one side of the rectangular opening portion 38 opposite to the side of the same continued from the vertex portion of the notch portion 37. At each of the front end portions of the side portions 22 and 23, rims 39 are integrally formed so as to define the surfaces of the notch portion 37. A clip opening spring portion 41 for opening or widening the vertically opposing lug portions 18 of the clip 15 is formed in each of the opening portions 38. Each clip opening spring portion 41 has a substantially lateral-turned V-shape in cross section. A vertex portion 42 of the V-shaped clip opening spring portion 41 is integrally formed at a portion of the side portion 22 (23) facing the above-mentioned one side of the opening portion 38 so that the vertex portion 42 is project at its one side into the second groove 33. In each of the clip opening spring portions 41, the front end portions of leg portions 43, which are opened opposite to the vertex portion 42, are disposed in the vicinity of the above-mentioned opening portion 38. The width of the leg portions 43 of each of the clip opening spring portions 41 may be made narrow so long as the leg portions 43 can be inserted between the lug portions 18 of the clip 15. Being formed integrally with the casing body 12, however, the leg portions 43 may be weakened in strength if the width thereof is made so narrow. The width of the leg portions 43 of the clip opening spring portion 41 is therefore made somewhat wider to increase the strength.

Openings 44 for sliding the knob 13 are formed in the upper portions 24 and 25 so as to longitudinally rearward extend from the vicinity of the above-mentioned side portions of the openings 38, and recess portions 45 each having a suitable arc are formed in the respective upper end portions of the side portions 22 and 23 at portions corresponding to the longitudinal side edge portions of the knob 13. Guide rims 46 are formed on the side portions 22 and 23 at portions in which the slide openings 44 are formed so that the guide rims 46 slightly project into the slide openings 44.

The cap portion 26 has an outer peripheral rim 47 formed to project upward except the thin portion 27 which is the boundary portion between the cap portion 26 and the bottom portions 21, so that the side portions 22 and 23 and the upper portions 24 and 25 can be partly fitted into the cap portions 26 at the inside of the peripheral rim 47. Hook-like engagement projections 48 are formed on portions of the inner periphery of the outer peripheral rim 47 which are to be in contract with the side portions 22 and 23, so that the hook-like engagement projections 48 are made to engage with corresponding recess portions 49 formed in the side protons 22 and 23 when the cap portion 26 is fitted onto the side portions 22 and 23, thereby making it not-easy for the cap portion 26 to come off from the side portions 22 and 23. Further, a stopper 50 is formed on the cap portion 26 so as to prevent the clip 15 from falling away from the rear ends of the first grooves 32.

As shown in detail in FIG. 8, the knob 13 to be inserted into the slide openings 44 is constituted by integrally formed three portions, that is, a knob projection portion 51 with its top end projected up from the slide openings 44, a push-out portion 52 projected downward from the front end of the knob projection portion 51 so as to abut, at its front end, against the bent portion 16 of the clip 15 disposed at the head of the series of inserted clips, and a horizontal portion 53 which extends substantially horizontally rearward from the knob projection portion 51. The push-out portion 52 and the lower portion of each of the knob projection portion 51 and the horizontal portion 53 are positioned in the slide openings 44 between the guide rims 46. Opposite side portions 54 of the knob projection portion 51 horizontally project so that the respective lower end surfaces of the opposite side portions 54 are located above the respective upper surfaces of the guide rims 46 with a predetermined gap therebetween. The horizontal portion 53 is provided, at its knob projection portion 51 side, with extending portions 55 so that the respective lower end surfaces of the extending portions 55 are located above the respective upper surfaces of the guide rims 46 with a predetermined gap therebetween. A notch portion 56 extending in the sliding direction of the knob 13 is formed substantially at the widthwise central portion of the rear portion of the horizontal portion 53 so that the opening end of the notch portion 56 is located at the rear end portion of the horizontal portion 53, and a first engagement rod portion 57 on which one end of the coil spring 14 is attached is provided in the notch portion 56. An engagement portion 58 is formed integrally with the push-out portion 52 on the front end central upper surface thereof so as to project frontward a little from the front end edge of the push-out portion 52 so that the engagement portion 58 may engage with the upper shoulder portion of the bent portion 16 of the clip 15.

A pair of front horizontal projections 59 is formed at the front opposite side surfaces of the push-out portion 52 of the knob 13 so as to horizontally extend so that the front horizontal projections 59 abut on the respective lower surfaces of the guide rims 46. Further, rear horizontal projections 61 are formed at the rear opposite sides of the push-out portion 52 so as to horizontally sideward extend toward the opposite side surfaces of the opening 41 to engage with the lower surfaces of the guide rims 46 in the same manner as the front horizontal projections 56. Thus, the knob 13 is arranged so as to be held, at each side of the knob 13, by the guide rim 46 between the lower surface of the side portion 54 of the knob projection portion 51 and the respective upper surfaces of the rear and front horizontal projections 59 and 61 so that the knob 13 may be slidably moved without coming off from the opening 41. Further, there is provided a gap between the upper surface of the side portion 54 and the respective lower surfaces of the rear and front horizontal projections 59 and 61 at each side of the knob 13 so that the knob 13 is movable up and down a little.

One end of the coil spring 14 is attached on the first engagement rod portion 57 as described above, and the other end of the coil spring 14 is hung to a second engagement rod portion 62 formed on the back surface of the portion of the upper portion 25 behind the slide openings 44 so as to project to this side in FIG. 2. A receiving portion 63 is formed on the back surface of the upper portion 24 at a position so that the top end of the second engagement rod portion 62 can fit into the receiving portion 63 when the side portions 22 and 23 are erected up so as to be opposite to each other. Thus, the knob 13 is always elastically pulled rearward by the coil spring 14.

Figure 13:
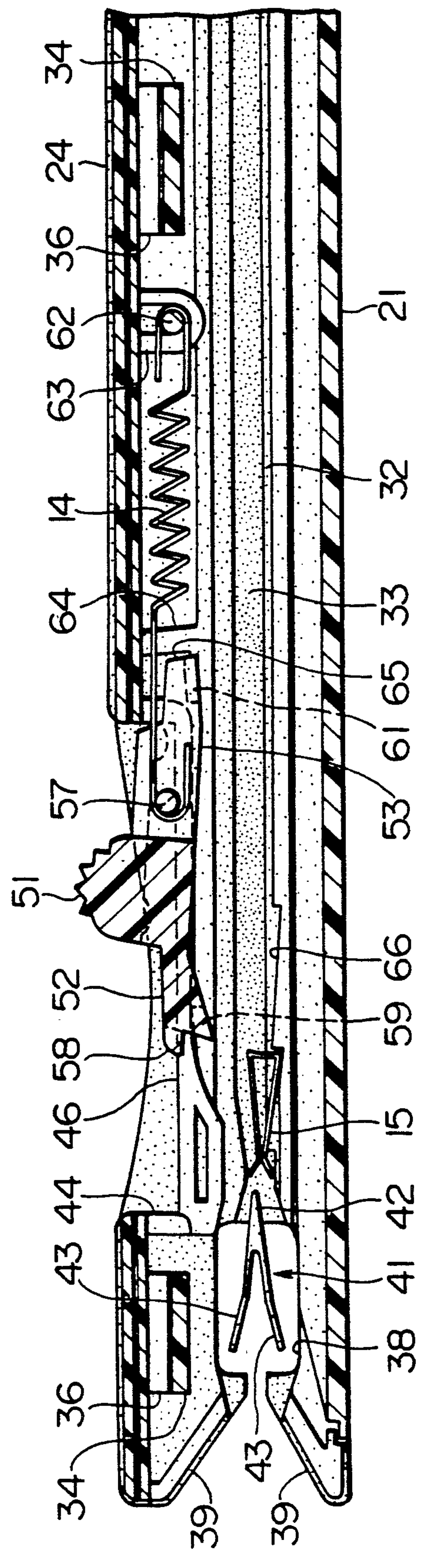
FIG. 13 is an enlarged longitudinal sectional view showing only the front end portion of FIG. 12.
Figure 14:
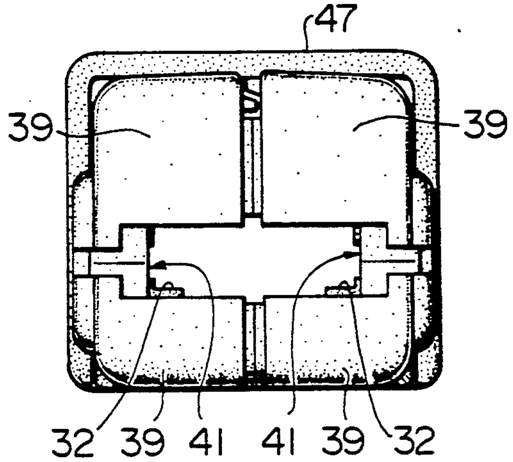
FIG. 14 is a sectional view taken on line XIV—XIV of FIG. 12.
Figure 15:
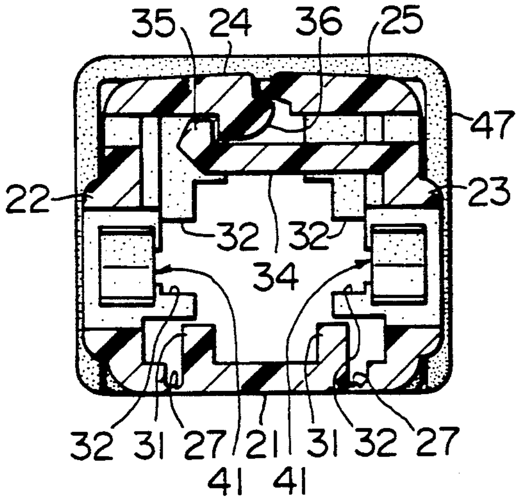
FIG. 15 is a sectional view taken on line XV—XV of FIG. 12.
Figure 16:
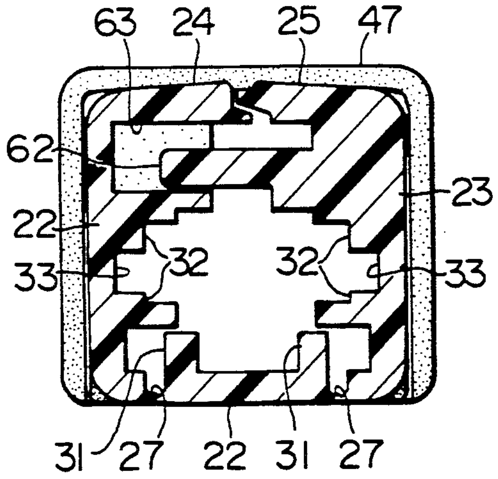
FIG. 16 is a sectional view taken on line XVI—XVI of FIG. 12.
Figure 17:
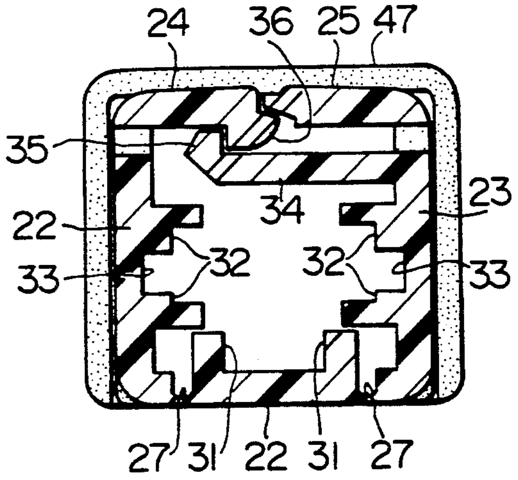
FIG. 17 is a sectional view taken on line XVII—XVII of FIG. 12.
Figure 18:
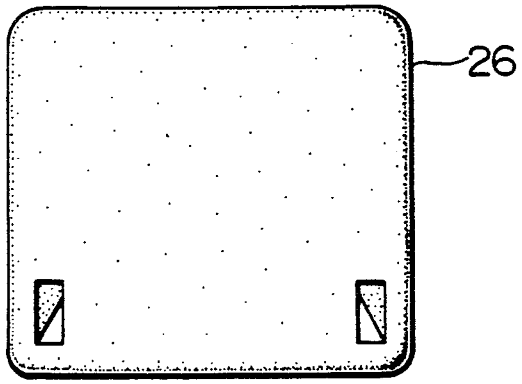
FIG. 18 is an end view in the direction of line XVIII—XVIII of FIG. 12.
Figure 19:
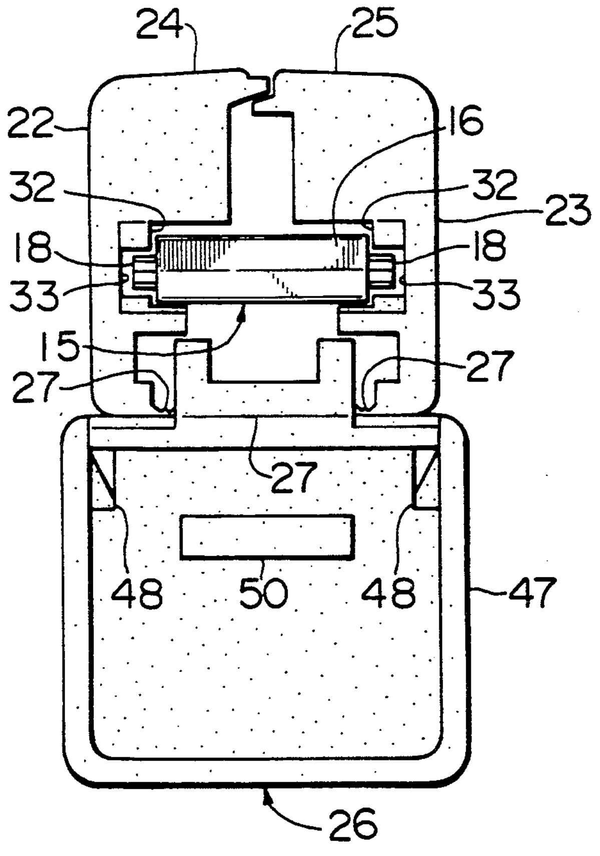
FIG. 19 is an end view showing a rear portion of the clip driver in the state where the cap portion is opened down.

The rearward displacement of the knob 13 by means of the coil spring 14 is limited by the abutment of the rear end edge of the horizontal portion 53 against limit projections 64 formed integrally with the side portions 22 and 23 respectively. A rear end surface 65 of the horizontal portion 53 which may abut against the limit projections 64 is tapered so that the lower end edge of the rear end surface 65 is more projected rearward than the upper end edge of the same. Thus, although elastic force is applied onto the knob 13 by the coil spring 14 so as to rotate the knob 13 clockwise about the rear end edge of the horizontal portion 53 in FIG. 13, the rotation of the knob 13 is limited because the front horizontal projections 59 of the push-out portion 52 engage with the lower surfaces of the guide rims 43 respectively.

Next, the assembling of the clip driver 11 will be described. First, the one end of the coil spring 14 is hung to the first engagement rod portion 57 of the knob 13. Next, the side portions 22 and 23 are erected up at the respective thin portions 27 which are the boundary portions between the side portions 22 and 23 and the bottom portion 21. On the way of the erection of the side portions 22 and 23, the knob 13 is put, at its one side, on the upper portion 25 so that the guide rim 46 of the slide opening 44 at the upper portion 25 side is sandwiched between the lower surface of the side portion 54 of the knob projection portion 51 at the one side surface of the knob 13 and the respective upper surfaces of the rear and front horizontal projections 59 and 61, and the other end of the coil spring 14 is hung to the second engagement rod portion 62. In this condition, the guide rim 46 of the slide opening 44 at the upper portion 24 side is made to be sandwiched between the lower surface of the side portion 54 of the knob projection portion 51 located at the other side surface of the knob 13 and the respective upper surfaces of the rear and front horizontal projections 59 and 61. When the side portions 22 and 23 have been erected up substantially at right angle, the longitudinal end edge portions of the upper portions 24 and 25 abut against each other and the hooks 35 formed on the engagement portions 34 of the upper portion 25 are engaged with the corresponding hooks 36 formed on the front end back surface of the upper portion 24, so that the pillar casing body 12 is completed. At this time, the clip 15 is inserted into the clip path constituted by the first and second grooves 32 and 33 opened at the rear end of the casing body 12. The clip 15 is inserted with the grasping portions 17 made front, and at this time the pairs of abutting end portions of the lug portions 18 are fitted respectively into the second grooves 33 formed in the respective opposite side portions 22 and 23. Then, if the front end of the casing body 12 is slightly inclined downward, the clip 15 slips down to the front end portion of the casing body 12 to enter head recess portions 66 and the vertex portions 42 of the clip opening spring portions 41 are located in direct front of the nip between the guide portions 19 of the grasping portions 17. The next clip 15 is inserted in the same manner as the first clip. Since the width of the first groove 32 is selected so as to be slightly larger than the thickness of the bent portion 16 of the clip 15, the front ends of the grasping portions 17 of the next inserted clip 15 never enter the nip between the bent portion 16 of the head clip 15 and the wall surfaces of the first grooves 32. Thus, a plurality of clips 15 are inserted so as to be aligned in a train. When a plurality of clips 15 have been inserted fully in the grooves of casing body 12 to the rear end thereof, the cap portion 26 is erected up at the thin portion 27 which is the boundary between the bottom portion 21 and the cap portion 26 so that the rear end portion of the casing body 12 is covered with the cap portion 26. As a result, the respective engagement projections 48 of the cap portion 26 engage with the recess portions 49 formed in the outer surfaces of the side portions 22 and 23 respectively so that the cap portion 26 never easily comes off from the side portions 22 and 23.

Thus, the clip driver 11 is constituted by only three members, that is, the casing body 12 of synthetic resin, the knob 13, and the coil spring 14. Since all the various portion, that is, the upper portions 24 and 25, the clip opening spring portions 41, the guide rims 46, the second engagement rod portion 62, and the like, are directed upward when the casing body 12 is formed in the flat plate state as shown in FIG. 2, and the casing body 12 can be easily produced through injection molding or the like. Further, such assembling as described above can be extremely easily performed without using any special tool.

Figure 1:
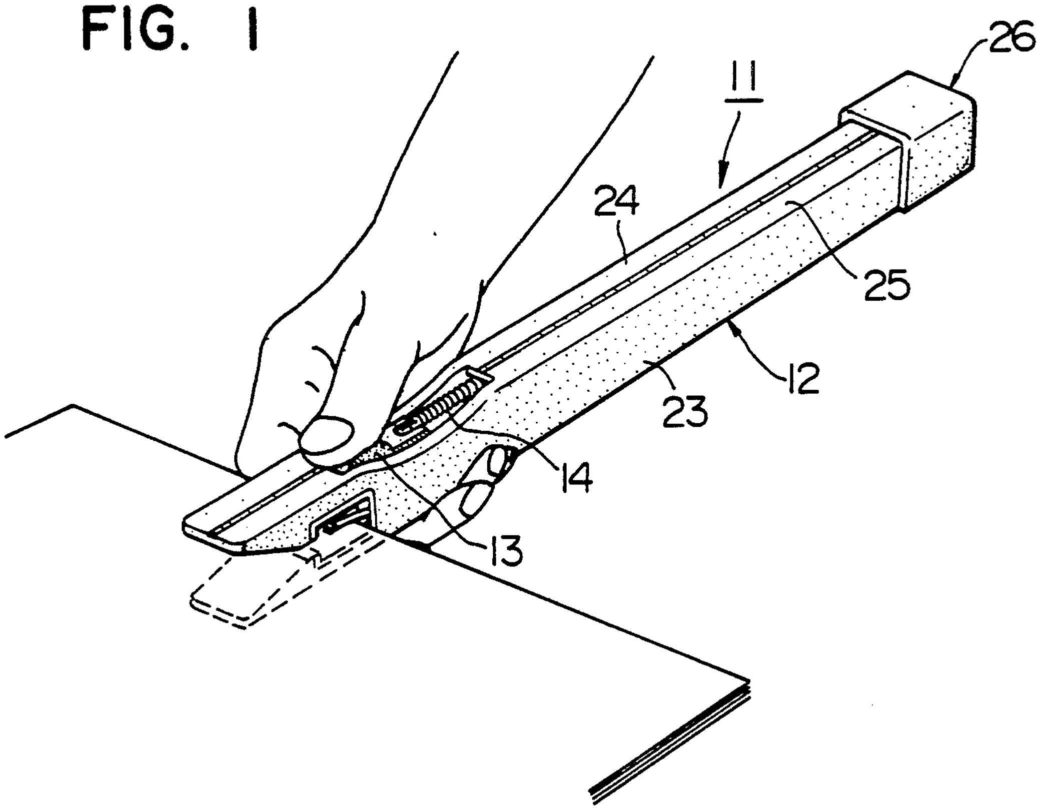
FIG. 1 is a perspective view showing an embodiment of the clip driver according to the present invention in the state where the clip driver is being used.

When documents are to be bound together by a clip, the clip driver 11 is held by one hand with a thumb put on the knob projection portion 51 of the knob 13 as shown in FIG. 1, and then the knob projection portion 51 is pushed down by the thumb. As a result, the front end push-out portion 52 and the knob projection portion 51 of the knob 13 supported substantially horizontally by the coil spring 14 are lowered so that the lower end surfaces of the opposite side portions 54 of the knob projection portion 51 come into abutting on the upper surfaces of the guide rims 46. In this condition, the knob 13 is slid toward the insertion inlet 17. As a result, the front end of the push-out portion 52 abuts on the corner of the bent portion 16 of the head clip 15. Then, if the knob 13 is further slid frontward against the spring force of the coil spring 14, the clip 15 is advanced by the knob 13 so that the vertex portions 42 of the clip opening spring portions 41 are made come into the nip between the front end guide portions 19. If the knob 13 is further slid, the leg portions 43 of each clip openig spring portion 41 come into the nip between the corresponding one of the pairs of vertically opposite lug portions 18 of the clip 15 so that the nip between the grasping portions 17 of the clip 15 is opened by the elasticity of the leg portions 43 against the spring force of the clip 15. When the guide portions 19 of the clip 15 has come to the vicinity of the notch portions 37 of the opening portions 38, the pair of grasping portions 17 are opened so as to be substantially parallel to each other so that documents or the like to be bound can be inserted therebetween. If the knob 13 is further advanced, the lug portions 18 of the clip 15 are separated frontward from the front ends of the leg portions 43 of the respective clip opening spring portions 41 and the clip 15 is ejected from the notch portions 37, while the clip 15 grasping the documents 71 between the grasping portions 71. The maximum thickness of documents which can be clipped together is substantially equal to the height of the bent portion 16 of the clip 15.

When the next clip 15 is to be disposed at the head position, the knob 13 is released from the finger and the front end of the casing body 12 is slightly inclined downward so that the next clip 15 comes into the front end recess portions 66. That is, the push-out portion 52 of the knob 13 is returned to its original upper position by the function of the coil spring 14 when the knob 13 is released from the finger, and since the lower surface of the push-out portion 52 is not projected into the path for the clip 15 in the first grooves 32, the clip 15 can be freely slid in the first grooves 32.

Although the present invention has been described with reference to the preferred embodiment, it will be appreciated that the description has made for the purpose of understanding the present invention, and various changes and modifications can be made without departing from the spirit and scope of the appended claims.

What is claimed is:

1. A clip driver for binding materials together by using one of a plurality of clips accommodated in said clip driver, each of said clips being made of a single elastic plate-like member and being constituted by a bent portion and a pair of grasping portions continued from said bent portion and having extremities normally elastically contacting with each other so that said grasping portions can grasp the materials therebetween, said clip driver comprising a casing body having an inner portion for accommodating said plurality of clips and having, at its front end, an opening portion forming an insertion inlet for inserting the materials to be bound, a knob member slidably mounted on said casing body for pushing-out said clip, and an elastic member for elastically biasing said knob member in a direction opposite to a direction pushing-out said clip, in which said casing body is made of a rectangular plate-like member of synthetic resin composed of:

a bottom portion having longitudinally extending opposite edge portions;

a pair of side portions having longitudinally extending edge portions respectively, each edge portion being bendably continuously connected to each opposite edge portion of said bottom portion;

a pair of upper portions having longitudinally extending edge portions respectively, each edge portion being continuously connected at substantially right angle to each longitudinally extending edge portion of said respective side portions, each of said upper portions having a width in a direction perpendicular to said longitudinally extending edge portion thereof which is substantially half of a width of said clip driver;

a cap portion continuously bendably connected at its one side to a rear end of said bottom portion;

notch portions formed in front end surfaces of said side portions respectively so as to form said opening portion;

clip opening spring portions formed on said side portions respectively, each of said clip opening spring portions having a vertex end portion and a pair of leg portions extending from said vertex end portion toward said notch portion so as to gradually separate from each other;

knob openings formed in said respective upper portions adjacently to said notch portions for mounting said knob member;

a plurality of first hook portions integrally formed on one longitudinally extending edge portion of one of the upper portions so as to project from the upper portion, a plurality of second hook portions integrally formed on one longitudinally extending edge portion of the other of the upper portions corresponding to the respective first hook portions; and said side portions and said cap portion being erected up from said bottom portion at continuously bendable connection portions therebetween so as to form pillar-like casing body having a path for accommodating therein said clips, said first and second hook portions engaging together when the casing body is assembled to complete the casing body.

2. A clip driver according to claim 1, in which a pair of first longitudinally extending grooves are formed in inner surfaces of said side portions respectively, each of said first grooves having a width slightly larger than a thickness of said bent portion of said clip so that widthwise end portions of said bent portion are fitted in said first grooves respectively, and in which a pair of second longitudinally extending grooves are respectively formed in said first grooves at substantially widthwise central portions so that widthwise opposite ends of said grasping portions of said clip are fitted in said second grooves.

3. A clip driver according to claim 1, in which guide rims are formed respectively on said opposite side portions at portions facing said knob openings so as to extend in a displacement direction of said knob, and in which said knob has a knob projection portion projected upward from said knob openings when said knob is mounted in said knob openings, a push-out portion formed on a front end of said knob projection portion so as to abut against said bent portion of said clip when said push-out portion comes down, horizontal portions which extend rearward from a rear end of said knob projection portion so that one end of said elastic member is attached to said horizontal portions, first lower projections formed on side surfaces of said push-out portions so that said first lower projections engage with respective surfaces of said guide rims at said bottom portion side when said knob comes up, and upper projections formed on side surfaces of said knob projection portion so as to engage with edges of said knob opening when said knob comes down to thereby limit further coming-down of said knob, said knob being slidably supported by said first lower projections and said upper projections so as not to come off from said knob opening.

4. A clip driver according to claim 1, in which a pin is formed on a portion of one of said side portions behind said knob opening so as to project a front end thereof from said one side portion and a receiving portion for receiving said pin is formed on the other of said side portions at a position corresponding to said pin when said side portions are erected up from said bottom portion, and in which one end of said elastic member having the other end attached on said knob is engaged with said pin.

5. A clip driver according to claim 1, in which said cap portion has an outer peripheral rim for receiving therein respective rear ends of said side portions and said upper portions, and in which engagement projections are formed on an inner surface of said outer peripheral rim at portions which come into contact with said side portions and engagement recess portions for receiving said engagement projections are formed on portions of said side portions corresponding to said engagement projections.

6. A clip driver according to claim 1, in which a pair of first longitudinally extending grooves are formed in inner surfaces of said side portions respectively, each of said first grooves having a width slightly larger than a thickness of said bent portion of said clip so that widthwise end portions of said bent portion are fitted in said first grooves respectively, and in which a pair of second longitudinally extending grooves are respectively formed in said first grooves at substantially widthwise central portions thereof so that widthwise opposite ends of said grasping portions of said clip are fitted in said second grooves, and in which said respective vertex end portions of said clip opening spring members are projected into said second grooves so as to be positioned at the nip between said grasping portions of said clip so as to limit coming-off of said clip from said insertion inlet.

7. A clip driver according to claim 2, in which recess portions are formed in said first grooves of said side portions in bottom surfaces thereof which become lower surfaces of said first grooves when said side portions are erected up from said body portion.

8. A clip driver according to claim 3, in which limitation portions are formed on said side portions at said knob opening rear end sides respectively so that said limitation portions abut on said projection portion of said knob so as to limit retreat of said knob, and said rear end of said projection portion is tapered so as to point-contact with said limitation portions, the point-contacting portions being located lower than a connecting portion between said projection portion and said elastic portion.

9. A clip driver according to claim 3, in which an engagement portion for engaging with said bent portion of said clip is formed on a front end of said projection portion of said knob.

* * * * *